United States Patent Office 3,558,431
Patented Jan. 26, 1971

3,558,431
OXIDATION PROCESS
Charles T. Goodhue and James R. Schaeffer, Rochester, N.Y., assignors to Eastman Kodak Company, Rochester, N.Y., a corporation of New Jersey
No Drawing. Filed May 8, 1968, Ser. No. 727,722
Int. Cl. C12d 13/00
U.S. Cl. 195—49                                    13 Claims

ABSTRACT OF THE DISCLOSURE

A method of microbially oxidizing a polyhydric branched chain alkanol containing at least one primary alcohol group such as pentaerythritol, using a new microorganism *Flavobacterium oxydans* (ATCC No. 21,245) in a nutrient medium which supports growth of said microorganism.

BACKGROUND OF THE INVENTION

Field of the invention

This invention relates to the microbial oxidation of organic compounds and to compositions useful for this purpose. In one aspect, this invention relates to the microbial oxidation of polyols by a new microorganism. In another aspect, this invention relates to the production of tris(hydroxymethyl)acetic acid from pentaerythritol by fermentation with a microorganism, *Flavobacterium oxydans*.

Description of the prior art

Methods for oxidizing various substances by microbiological means are generally well known. In fact, the general reaction of converting a primary alcohol to a carboxylic acid by oxidation is common in living systems. Consequently, it is not surprising that many oxidizing microorganism have been cultured on a suitable nutrient medium containing various organic compounds in order to obtain either oxidation by-products or cellular metabolites. However, such cultures have not always been productive. For example, various investigators have heretofore reported that one such compound, a polyhydric alkanol, pentaerythritol is substantially unaffected by bacteria and other microorganisms in general, and in particular by acetic acid bacteria. See "Oxidation of Aliphatic Glycols by Acetic Acid Bacteria," DeLey and Kersters, Biological Reviews, volume 28, No. 2, pages 164–180. See "The Oxidation of Glycols by Acetic Acid Bacteria," Kersters and DeLey, Biochim. Bioplys. Acta., 71 (1963), pages 311–331.

The possibility of microbiologically converting organic compounds, and particularly various polyhydric alcohols, to their respective carboxylic acids is of considerable value because of the commercial value of said acids. For example, some of said alcohols such as glycerol, glucose, ethylene glycol, sobitol, mannitol and the like are sources of valuable acids which include gluconic, glycollic, succinic, ascorbic acids and the like.

The microbiological conversion of pentaerythritol to its carboxylic acid, tris(hydroxymethyl)acetic acid is particularly of considerable value to the art because various chemical methods for synthesis of tris(hydroxymethyl)acetic acid by oxidation of pentaerythritol has resulted in only very low yields. In addition, these chemical reactions are dangerous because they involve nitrations or are very expensive to run on a large scale since they are platinum-catalyzed. Tris(hydroxymethyl)acetic acid is particularly useful as an intermediate in the preparation of substituted 3-pyrazolidones, such as those described in Eastman Kodak Belgian Pat. 700,008 issued Aug. 14, 1967, which are particularly useful in photographic applications as developing agents. Methods for converting hydroxymethylacetic acids to 3-pyrazolidones are described in U.S. Pat. 2,772,282 of Allen and Byers issued Nov. 27, 1953; 2,843,598 of Donovan issued July 15, 1958; and 2,743,279 of Reynolds and Tinker issued Apr. 24, 1956. The chemical art and more particularly the photographic art would be enhanced by new means for oxidizing organic materials and particularly for producing various acids such as tris(hydroxymethyl)acetic acid in high yields at relatively low cost and with little risk of danger.

SUMMARY OF THE INVENTION

We have now found a method for microbiologically oxidizing organic compounds, e.g., microbiologically oxidizable carbon compounds such as aliphatic, aromatic and alicyclic alcohols and aldehydes. Such materials can be saturated or unsaturated, straight or branch chain, as described herein. This invention is particularly effective in carrying out the oxidation of alcohols, e.g. polyhydric alkanols containing up to about 18 carbon atoms and more particularly branched-chain compounds containing at least one primary alcohol group. These polyols, such as pentaerythritol, for example, for their respective carboxylic acids from the fermentation by a new bacterial organism as described herein.

As already indicated, the microorganism described herein is very effective in oxidizing pentaerythritol. Closely related primary alcohols can also be employed in practicing this invention, as exemplified by dipentaerythritol, 2-hydroxymethyl-2-methyl-1,3-propanediol, 2-hydroxymethyl-2-propyl-1,3-propanediol, 2,2-dimethyl-1,3-propanediol, neopentyl alcohol and the like.

The oxidation reaction of pentaerythritol to its acid by microbial means is particularly unexpected and unobvious for nowhere is there any reference to the susceptibility of said pentaerythritol to oxidative organisms generally and, more particularly, to acetic acid bacteria. In fact, the resistance to biooxidation of said alchol has long been recognized as stated heretofore. In addition, we have found that various oxidizers from the different genera including acetic acid bacteria and such as *Bacillus, Saccharomyces, Pseudomonas, Flavobacterium, Nocardia, Rhizopus, Acetobacter, Mycobacterium, Lactobacillus, Penicillium, Xanthamonas, Chromobacterium, Arthrobacter, Rhodospirillum* and *Helicostylum* have all been unable to produce acids from penaterythritol. More particularly, some of the species of said genera showing no oxidative activity include *Flavobacterium aquatile, Flavobacterium suaveolens, Flavobacterium devorans, Nocardia carolina, Pseudomonas putida* and *Arthrobacter oxydans*.

OBJECTS

It is, therefore, an object of our invention to provide a method of microbially oxidizing organic compounds such as an alcohol or aldehyde. It is still another object of our invention to provide a specific organism which will convert polyhydric alcohols such as pentaerythritol to their carboxylic acids such as tris(hydroxymethyl)acetic acid directly. It is yet another object of our invention to provide a new source, that is a fermentation process, of tris(hydroxymethyl)acetic acid. It is another object of our invention to provide a safe, inexpensive and effective means of producing tris(hydroxymethyl)acetic acid in high yields. Other objects will be apparent from the following claims, examples and the general disclosure.

DESCRIPTION OF THE PREFERRED EMBODIMENTS

One preferred embodiment of our invention comprises a microbiological oxidation process which comprises aerobically oxidizing an organic compound with a microorganism *Flavobacterium oxydans* (ATCC No. comprising, a source capable of supporting growth of said microorganisms.

A preferred embodiment of our invention comprises a process for microbiologically oxidizing a tetrahydric alcohol such as pentaerythritol and its analogues which process comprises aerobically growing cells of the oxidizing microorganism *Flavobacterium oxydans* (ATTC No. 21,245) in an aqueous nutrient medium, said medium comprising a source capable of supporting growth of said microorganisms.

Another preferred embodiment of our invention comprises a process for preparing tris(hydoxymethyl)acetic acid which process comprises subjecting pentaerythritol to the microorganism *Flavobacterium oxydans* (ATTC No. 21,245) in an aqueous nutrient medium under areobic conditions.

In still another preferred embodiment of our invention, we introduce pentaerythritol initially into the fermentation medium in a concentration of about from 0.5 to about 3% by weight per liter of culture medium and in increments thereafter until up to about 15% and preferably about 6% of pentaerythritol by weight per liter of culture medium is present in order to insure high yields of tris(hydroxymethyl)acetic acid.

This introduction process of pentaerythritol by increments can be repeated numerous times with similar or the same weights of alcohol depending upon the vitality of the organism and the corresponding microbial conversion of said pentaerythritol into tris(hydroxymethyl)acetic acid.

Preferred carbon compounds oxidized in accordance with the present process are those containing at least one primary alcohol unit and preferably alkanols, e.g., polyhydric alkanols such as pentaerythritol. These alcohols are generally present in the nutrient medium in amounts of from about 0.5 to about 10% by weight and preferably about 1–6% by weight per liter of medium, said 10% by weight being the equivalent needed to insure a saturated solution of pentaerythritol at a temperature of about 30° C.

In another preferred embodiment of our invention we include a composition of matter comprising a microorganism *Flavobacterium oxydans* (ATCC No. 21,245) or its cellular metabolites and a nutrient growth medium comprising an oxidizable carbon-containing source.

The carbon-containing substrates and energy sources employed in the process of our invention include any of the known sugars or starches or energy sources or mixtures containing them such as pentaerythritol, acetic acid, sucrose, glucose, glycerol, succinic acid, ethylene glycol, citric acid and the like in an amount which allows sufficient organism growth, for example, from about 0.1 to about 0.3 and preferably 0.2% by weight of nutrient medium.

As will be obvious to those skilled in the art, the fermentation medium contains, in addition to the foregoing materials, mineral salts on which the organism can grow and should also contain an available source of nitrogen, phosphorus, and sulfur, and, in addition, ferric, manganous and like ions as well as other trace metal ions. Suitable examples of these ions are in such compounds as ammonium nitrate, potassium diphosphate, ferrous sulfate, magnesium sulfate and the like diluted with a sufficient volume of water and adjusted to a pH of about 5.5 to 8.5 and preferably a pH of about 7.2 to 7.6. In addition to the foregoing nutrients, we have found that the rate of production of acid such as tris(hydroxymethyl)acetic acid can be further increased somewhat if growth-stimulating materials are added such as yeast extract at concentrations of about 0.1 to about .3 and preferably 0.2 gram per liter. Other suitable growth-stimulating materials which are also used include such substances such as pure vitamin mixtures, distillers solubles, corn steep liquors and the like. It will be understood by those skilled in the art that nitrogen can be provided by numerous sources such as by dried yeast extract in a concentration of about 1%. At this level the yeast extract also supplies such other nutrients as sulfate, phosphate and various metal ions. Included in this general class of nutrients is cotton seed meal and soybean meal, for example. Additional simple sources of nitrogen are glutamic acid, glutamine, aspartate, urea, nitrate ions, and combinations thereof including said glutamic acid with asparagine, for example, but other nitrogen sources are equally suitable.

The microorganism employed in the process of this invention is capable of oxidizing various organic compounds, preferably alcohols, such as polyhydric alkanols, e.g., pentaerythritol to their carboxylic acids while simultaneously utilizing carbohydrates or some other common carbon energy source to support their growth. The microorganism which we have unexpectedly found to be particularly effective in this regard is a newly discovered microorganism designated as *Flavobacterium oxydans*. A culture of a preferred strain of said microorganism has been deposited with the American Type Culture Collection in Washington, D.C., under the accession number ATCC No. 21,245. Sub-cultures of said microorganism can be obtained from said depository upon request and are available generally to the public under said accession number. This microorganism was isolated from the soil in Rochester, N.Y., by an elective culturing technique whereby 150 grams of soil is added to a 250 ml. of medium having the following formulation.

| Nutrient: | Grams per liter of water |
|---|---|
| Pentaerythritol | 20.0 |
| $(NH_4)_2SO_4$ | 2.0 |
| $K_2HPO_4$ | 2.0 |
| $MgSO_4 \cdot 7H_2O$ | 0.25 |
| $MnSO_4 \cdot 7H_2O$ | 0.17 |
| $FeSO_4 \cdot 7H_2O$ | 0.028 |
| NaCl | 0.0006 |
| $CaCl \cdot 2H_2O$ | 0.001 |
| $ZnSO_4 \cdot 7H_2O$ | 0.0006 |
| Yeast extract | 0.2 | and incubated without agitation for two weeks at about 30° C. Portions of this culture are then used to inoculate fresh sterile culture media which is then incubated for one more week at about 30° C. It has been found desirable to agitate said media, for example, at about 400 r.p.m. during incubation.

On isolation, the organism is found to comprise at least two strains having the following cultural and physiological characteristics which identify them and distinguish them from other known microorganisms. As will be readily understood by those skilled in the art, other similar oxidizing mutants are spontaneously devolved from these microorganisms and easily detectable from the microorganism disclosed herein and identified as *Flavobacterium oxydans* (ATCC No. 21,245). In adddition, mutations can also be obtained from our new microorganisms by other known means such as the application of various mutagenic agents including ultraviolet rays or ethyl methanesulfonate, for example. Two of said strains, designated herein as Pe 25 and Pe 25 sm 1, differ from each other only in that the former, a preferred strain, can grow on, and metabolize, pentaerythritol as its sole carbon source while the latter requires an additional carbon source such as is disclosed hereafter. These two strains are visually distinguished from each other by the color they impart to a pH indicating nutrient medium containing pentaerythritol and by their colony size.

The microorganism *Flavobacterium oxydans* (ATCC No. 21,245) is found to have the following cultural and physiological characteristics which identify and distinguish it from other microorganisms:

Staining characteristics

Age, hours:
- 18 — Gram (−).
- 168 — Gram variable (+) and (−).

Non-acid fast.

Cell morphology (after growth on glucose-yeast extract medium for periods up to 7 days)

- Form — Rods, $0.6–0.7\mu \times 0.8–1.0\mu$ most often in pairs or short chains up to about 8 organisms.
- Motility — Non-motile.
- Asporagenous.
- Unencapsulated.

Agar colonies (glucose-yeast extract medium)

- Age — 72 hours.
- Form — Circular.
- Elevation — Convex.
- Surface — Smooth.
- Margin — Entire.
- Chromogenesis — Off-white initially becomes yellow in 5 days.

Agar stroke (glucose-yeast extract medium)

- Age — 72 hours.
- Form — Filiform.
- Consistency — Butyrous.
- Chromogenesis — Off-white initially, then yellow after 5 days.

Nutrient broth

- Age — 7 days.
- Surface Growth — None.
- Clouding — Slight.
- Sediment — Compact.
- Amount — Scant.

Gelatin stab (glucose-yeast extract and 5% gelatin)

- Age — 14 days.
- Liquification — None.
- Growth — Abundant surface growth.

Potato dextrose colonies

- Age — 7 days.
- Growth — None.

Hugh-Leifson carbohydrate medium

- Age — 14 days.
- Oxygen relationship — Strictly aerobic.
- Glucose, slightly acid — No gas.
- Lactose, alkaline — No gas.
- Sucrose, acid — No gas.
- Glycerol, acid — No gas.
- Mannitol, acid — No gas.

Action on milk

- Age — 14 days.
- Litmus — Alkaline, no coagulation: no reaction.
- Ulrich — Alkaline with reduction.

Loeffler blood serum

- Age — 21 days.
- Growth — None.

Sim medium

- Age — 14 days.
- Motility — None.
- $H_2S$ — None.
- Indole — None.

Kligler iron agar

- Age — 14 days.
- $H_2S$ — None.

Dextrose and lactose not fermented.

Alkaline egg medium

- Age — 14 days.

No proteolytic activity.

Additional special tests

Good growth in 5 percent ethanol-1 percent yeast extract within 4 days; pH value remains at 7.5; no growth in 10 percent ethanol-1 percent yeast extract Good growth in citrate medium within 7 days; weak pellicle formed Good growth in 3 percent NaCl glucose-yeast extract within 72 hours; no growth when NaCl increased to 10 percent No growth in uric acid medium within 14 days Methyl red negative Voges-Proskauer negative Starch not hydrolyzed Nitrite produced from nitrate Cellulose not hydrolyzed

Temperature relations

- Age — 72 hours.
- 4° C. — No growth.
- 25° C. — Poor growth.
- 30° C. — Abundant growth.
- 37° C. — No growth.

Additional carbon sources

Growth on:
(a) both strains, i.e. Pe 25, Pe 25 sm 1—acetate; succinate; ethylene glycol; D-ribitol; i-erythritol; D-xylose
(b) strain Pe 25 only—pentaerythritol; dipentaerythritol; 2-hydroxymethyl-2-methyl-1,3-propanediol; 2-hydroxymethyl-2-ethyl - 1,3 - propanediol; 2-hydroxymethyl-2-propyl-1,3-propanediol; 2,2 - dimethyl-1,3-propanediol; neopentyl alcohol; monoacetin; D-xylitol; D-arabitol; sorbitol No growth or poor growth on:
(a) 2-deoxy-D-glucose; D-glucuronolactone; dulcitol; 2 - (hydroxymethyl)-2-nitro-1,3-propanediol; 2-(hydroxymethyl) - 2 - amino-1,3-propanediol; 2-(hydroxymethyl)-2,2-diphenyl-1,3-propanediol; 2 - methyl-2-nitro-1,3-propanediol

Additional nitrogen sources

Growth on: $NO_3^-$; $NH_4^+$; asparagine; glutamate; complex natural sources such as cotton seed meal, yeast extract, casein hydrolysate, various peptones, and soybean meal Poor source: urea The process of this invention is desirably effected at a temperature of from about 20° C. to about 37° C. and preferably from 28° C. to 30° C. under aerobic conditions. Stirring is desirable although agitation can also be used, for example, in shaking flasks or other suitable means.

Microorganism growth rates are unexpectedly and conveniently controlled by varying the conditions of temperature, aeration and inoculum size and state. In nutrient rich media microorganism growth rates below maximum allow a maximum induction of oxidizing enzymes. In particular, the growth rate in stirred fermentors, for example, is easily controlled by reducing the temperature from 30° C. to about 22° C. and preferably to about 23° C. to about 24° C. In addition, we use low aeration rates, that is, from about 0.10 to about 0.14 and preferably 0.12 volume of air per volume of medium per minute.

We have also found it advantageous to use inocula from the middle of the logarithmic growth phase, that is, in the period from about 40 to about 72 hours of growth and preferably about 48 hours of growth. Example 6 illustrates the logarithmic growth phase for the microorganism *Flavobacterium oxydans* (ATCC No. 21,245). This rate of growth produces pentaerythritol enzyme induction very nearly to the maximum amount so that from about 50% to about less than 100% and more nearly about 97% of the alcohol is generally oxidized to tris(hydroxymethyl)acetic acid on incubation. The appearance of tris(hydroxymethyl)acetic acid is accompanied by a corresponding disappearance of pentaerythritol of which very little is lost to side reactions. While there is an early rise in the pH value of the nutrient medium from about 7.0 to about 8.0 followed by a decrease to about 5.6 as the tris(hydroxymethyl)acetic acid accumulates, the pH is generally maintained in a range from about 3.0 to about 9.5, and preferably about 6.0 to about 8.0.

Generally, the growth of the culture occurs during the first three days of incubation but thereafter the culture remains in a stationary growth phase during which time, however, oxidation continues. We neutralize the oxidation product, e.g., tris(hydroxymethyl)acetic acid thus formed in the nutrient medium, with a suitable base such as $K_2CO_3$ or $CaCO_3$, for example. By adding stepwise pentaerythritol to that already present in a concentration of from about 1 to 3% so that a total of about 10% is present and preferably about 6% pentaerythritol by weight, we have obtained yields of up to 64 grams per liter (97% of theoretical).

In order to obtain pure oxidation product, e.g., tris(hydroxymethyl)acetic acid, the whole culture broth including the microorganisms is centrifuged thereby removing said microorganisms. The resulting broth is then neutralized to pH 7.0, for example, with KOH, NaOH, lime and the like. This neutral broth is then contacted with an ion exchange resin and the acid is adsorbed thereon prior to its being eluted with an aqueous acid solution. For purposes of our invention, we have found that a strongly basic anion exchange resin can be conveniently used. Elution is preferably completed with formic acid.

The oxidation product, e.g., tris(hydroxymethyl)acetic acid, is readily recovered from the aqueous solution, for example, by evaporating it to dryness under favorable conditions. The resulting product can, if one so desires, be further purified, by recrystallization, for example, from an organic solvent, such as ethanol, benzene or isopropanol, or from a mixture of solvents such as ethanol-benzene, for example.

Since the biological oxidation of carbon compounds takes place in discrete and separate steps yielding a series of intermediates and usually ending with $CO_2$ evolved, an alternative recovery procedure is of considerable use when it is necessary to decompose the carbonate which is bubbling in the exchange column when the formic acid is added. In this instance, the previously centrifuged fermentation broth is acidified to about pH 4 with a suitable acid such as formic acid; and nitrogen is bubbled through the broth for one hour. The pH of the broth is now adjusted to about pH 7 using a suitable base such as KOH or NaOH. Then the broth is again centrifuged and added to the ion exchange resin column.

The amount of oxidation product such as tris(hydroxymethyl)acetic acid in the broth can easily be determined by actual isolation of the acid and also by gas chromatographic procedures as set forth hereafter.

Variations in temperature and pressure during the various process steps include those shown and considerable variations are contemplated as is well known in the art.

In addition, while a preferred method of fermentation is disclosed herein, it will be obvious to those skilled in the art that numerous variations are possible, for example, oxidizable organic compound can be incorporated into the nutrient medium after initial incubation of the organism. Another alternative is to add the bacterial organism to a medium containing said organic compound initially. Further, said bacterial organisms can be added as inocula comprising whole cells, broken cells, cell extracts and the like in order to insure bacterial growth. Where the cells are broken, for example, various means such as physical, chemical and the like including vibrations can be used.

In practicing our invention, we have found that when *Flavobacterium oxydans* (ATCC No. 21,245) is subcultured on rich, non-specific media such as a nutrient of yeast extract (1%) and glucose (1%) or the acid production medium set forth before, said microorganism gradually loses its ability to oxidize. In order to insure that our organisms are sufficiently potent to produce a high yield of oxidation product, we have selectively picked those colonies of acid-producing strains from their cultures and maintained them thereafter. These colonies are easily distinguished 3–5 days after being spread on a pH-indicating culture medium containing pentaerythriol, by an acid assuming color as contrasted with non-acid assuming color of the non-producing strain. These colonies are picked, dispersed in a non-harmful maintenance solution such as physiological saline and spread on nutrient medium such as agar slants. After growth for 2 days at about 30° C., these cultures can be stored at reduced temperatures without any loss of potency for several months or longer. In the alternative and as only one of a number of means for storage and preservation, the cultures can be lyophilized from an aqueous suspension such as skimmed milk. When properly sealed, these cultures remain viable for extended periods of time.

In addition, we have found that the amount of tris(hydroxymethyl)acetic acid in our fermentation broths can be determined, not only by the actual isolation of the acid in the manner above-described but also by gas chromatographic procedures.

In such procedures, the apparatus includes using a conventional gas chromatograph (thermal conductivity detector). The column is a stainless steel tube 6 feet long 1/8" outer diameter. The packing is 10% silicon gum rubber (SE-30) on Chromosorb W, a trademark of Hewlett-Packard for calcined diatomite aggregates. The helium flow is 30 ml. per minute. The injection port temperature is 295° C. and the column temperature is programmed from 120° to 265° C. at a rise in temperature of 30° C. per minute. The thermal conductivity detector is operated at 300° C. using a 150 ma. bridge current.

The procedure evaporating a 1 ml. sample of fermentation broth to dryness using a free-dry apparatus. To this residue is added 0.3 ml. of chloro trimethylsilane, 0.3 ml. of 1,1,1,3,3,3-hexamethyldisilazane and 0.3 ml. of a pyridine solution of octadecane (0.08 g. octadecane made up to 1 ml. vol. with pyridine). After standing 4 hours, the sample is analyzed by gas chromatography. Injection volumes of 1.4 to 1.6$\mu$ liters are used. The amount of tris(hydroxymethyl)acetic acid in a milliliter sample of fermentation broth is determined in the following manner.

Samples of an analytical sample of tris(hydroxymethyl)acetic acid, ranging in size from 1 to 40 mg., are converted to their trimethylsilyl derivative. The samples are analyzed as above. A standard straight line curve is prepared by plotting the ratio of peak area of trimethylsilyl derivative to peak area of octadecane against the mg. of tris(hydroxymethyl)acetic acid in each sample.

When a sample of fermentation broth is analyzed as shown above, the value of mg. of tris(hydroxymethyl) acetic acid in the test sample on the graph corresponding to the ratio of peak area of product to peak area of octadecane is obtained.

The infrared spectrum of tris(hydroxymethyl)acetic acid and the mass spectrum of the trimethylsilylated acid prepared by microbiological oxidation of the acid are identical with the spectra obtained on a sample of the acid prepared by the platinum-catalyzed oxidation of pentaerythritol.

The following examples are included for a further understanding of the invention.

EXAMPLE 1

A fermentation is carried out in a series of 125 ml. Erlenmeyer flasks with stainless steel Morton closures. The aqueous nutrient medium in the flasks contains 25 ml. of medium containing acetic acid, as a carbon source, 2 g. per liter, yeast extract 10 g. per liter and pentaerythritol 20 g. per liter. The medium is neutralized to pH 7 with KOH and sterilized by autoclaving at 15 lbs. steam for 15 minutes. Each flask containing 25 ml. of medium is then inoculated with a loop having approximately 0.75 mg. (dry weight) of culture which previously grew 2 days on a nutrient slant at 30° C. The flasks are agitated at 30° C.±1° at 400 r.p.m. on a rotary shaker. The following results are obtained from periodic samplings of the fermentation broth:

|  | Acid Produced in g./liter | | |
|---|---|---|---|
| Days of fermentation | 2 | 4 | 7 |
| Flask Number: | | | |
| 1 | 5.38 | 10.00 | 10.27 |
| 2 | 6.80 | 12.50 | 15.65 |
| 3 | 6.25 | 10.30 | 11.42 |
| 4 | 2.65 | 8.41 | 10.60 |
| 5 | 5.70 | 10.32 | 11.08 |
| 6 | 6.03 | 10.20 | 11.15 |
| 7 | 5.25 | 10.77 | 11.07 |
| 8 | 7.35 | 10.48 | 14.85 |
| 9 | 3.13 | 9.72 | 12.05 |
| 10 | 5.90 | 10.00 | 10.85 |
| 11 | 3.50 | 10.00 | 11.28 |
| 12 | 2.40 | 9.80 | 11.31 |

In flasks No. 2 (at 2 days) and No. 8 (at 4 days) 200 mg. of $CaCO_3$ is added.

EXAMPLE 2

The fermentation of Example 1 is repeated and 250 mg. pentaerythritol and 200 mg. calcium carbonate are added step-wise during the period of incubation as shown by asterisk. The increased yield of tris(hydroxymethyl) acetic acid is noted after 7 days by comparing with the results of Example 1.

| Time (days): | Tris(hydroxymethyl)acetic acid g./liter |
|---|---|
| 0 | 0 |
| 3* | 13.2 |
| 4* | 19.1 |
| 5* | 22.3 |
| 6* | 35.5 |
| 7 | 45.0 |
| 11 | 64.0 |

EXAMPLE 3

Production of (hydroxymethyl)acetic acid in a small stirred fermentor with automatic neutralization with $K_2CO_3$ solution produces increased yields up to 97% of the theoretical oxidation of pentaerythritol to the tris(hydroxymethyl)acetic acid.

This fermentation is conducted in a cylindrical glass fermentor (650 ml. working capacity, 7 cm. diameter x 14 cm. height) and stirred with a magnetic stirrer (5 cm.) at 1200 r.p.m. Aeration rate is 80 cc. per minute (0.12 v.v.m.) at a temperature of 30° C. Foam is controlled whenever foam reaches a level of foam sensor by the automatic addition of a surfactant Antifoam C (a trademark of Dow Corning, a corporation of Midland, Mich.). The inoculum and the medium employed are the same as in Example 1; 10 g. solid pentaerythritol is added where shown by an asterisk and the automatic control of pH value to 7.0±0.3 with 1 M $K_2CO_3$ is commenced at the second day.

| Time (days): | Tris(hydroxymethyl)acetic acid in g./liter |
|---|---|
| 0 | 0 |
| 2* | 8.8 |
| 5* | 34.7 |
| 7 | 54.3 |

EXAMPLE 4

The effect of controlling of the aeration rate on accumulation of tris(hydroxymethyl)acetic acid in fermentors such as stirred fermentors is shown hereafter. Culturing is performed for 48 hours in a manner similar to that shown in Example 3.

| Aeration rate volume of air per volume of medium/minute: | Grams tris(hydroxymethyl) acetic acid per liter |
|---|---|
| 0.06 | 2.2 |
| 0.12 | 8.8 |
| 0.25 | Trace |

EXAMPLE 5

In a manner similar to that shown in Example 3, the effect of changing the initial concentration of pentaerythritol on the accumulation of tris(hydroxymethyl)acetic acid in a fermentation process is shown.

| Pentaerythritol (percent): | Grams per liter of tris (hydroxymethyl)acetic acid |
|---|---|
| 0.5 | 4.6 |
| 1.0 | 8.0 |
| 2.0 | 16.0 |
| 4.0 | 17.0 |
| 6.0 | 17.3 |
| 8.0 | 18.2 |
| 10.0 | 4.0 |

EXAMPLE 6

According to the procedure of Example 3, various samples are taken at specified intervals from cultures incubated at 30° C. The corresponding amounts of pentaerythritol and tris(hydroxymethyl)acetic acid are determined. The bacterial dry weight, that is, its growth, is also determined by measuring absorbance at 650 m$\mu$ and then comparing this value to dry weight versus absorbance.

| Time (Hours) | Pentaerythritol (mg./ml.) | pH | Growth (mg./ml.) | Tris(hydroxymethyl)acetic acid (mg./ml.) |
|---|---|---|---|---|
| 0 | 20.0 | 7.0 | 0.0 | 0.0 |
| 24 | 20.0 | 7.5 | 0.1 | 0.0 |
| 40 | 18.3 | 8.0 | 1.7 | 3.2 |
| 48 | 17.8 | 7.9 | 2.5 | 4.0 |
| 60 | 12.8 | 7.2 | 4.4 | 8.0 |
| 72 | 10.2 | 6.8 | 4.6 | 10.0 |
| 80 | 9.4 | 6.2 | 4.6 | 11.2 |
| 96 | 8.6 | 5.8 | 4.6 | 12.2 |
| 120 | 7.8 | 5.4 | 4.5 | 13.0 |

The foregoing examples illustrate results obtained with a preferred nutrient medium, i.e., one comprising pentaerythritol. However, as already indicated, similar biological oxidation will be obtained when other oxidizable carbon compounds are substituted for pentaerythritol.

The invention has been described in detail with particular reference to certain preferred embodiments thereof, but it will be understood that variations and modifications can be effected within the spirit and scope of the invention as described hereinabove and as defined in the appended claims.

We claim:

1. A microbiological oxidation process which comprises aerobically oxidizing a polyhydric branched-chain alkanol containing at least one primary alcohol group with a microorganism *Flavobacterium oxydans* (ATCC No. 21,245) in a nutrient medium, said medium comprising a carbon source capable of supporting growth of said microorganism.

2. A process according to claim 1 in which said alkanol is a tetrahydric alkanol.

3. A process according to claim 2 in which said alkanol is pentaerythritol.

4. A process according to claim 3 wherein said pentaerythritol is present in a concentration of from about 5 to about 100 grams per liter of aqueous nutrient medium.

5. A process described in claim 1 in which said source of carbon comprises pentaerythritol.

6. A process according to claim 1 in which said alkanol is oxidized to tris(hydroxymethyl)acetic acid.

7. A process described in claim 1 in which said carbon source comprises pentaerythritol, acetic acid, succinic acid, citric acid, glycerol, glucose, ethylene glycol or sucrose.

8. The process according to claim 1 in which the temperature during said process is maintained in the range of about 22 to about 24° C., aeration rate is in the range of about 0.10 to about 0.14 volume of air per volume of medium per minute and said microorganism is obtained from the 40 to about 72-hour phase of its growth.

9. A process according to claim 1 whereby said microorganism is provided by a process which comprises selectively picking acid-producing colonies of said microorganism from a nutrient medium comprising a precursor for said acid, dispersing in a maintenance solution, growing on a nutrient medium, harvesting, and storing said microorganism.

10. The process according to claim 9 which comprises introducing said pentaerythritol initially into said nutrient medium in a concentration of about 0.5 to about 3% by weight per liter of nutrient medium and in increments thereafter until up to about 15% of pentaerythritol by weight per liter of nutrient medium is present.

11. The process according to claim 1 in which said nutrient medium is at a pH in the range of about 3.0 to about 9.5 and tris(hydroxymethyl)acetic acid is recovered.

12. The process of claim 1 in which the temperature of said medium is in the range of about 20 to about 370° C.

13. The process of claim 11 in which said recovery includes the steps of separating microorganism from aqueous nutrient medium and recovering a whole broth, neutralizing said broth and recovering said tris(hydroxymethyl)acetic acid.

References Cited

UNITED STATES PATENTS 2,985,563   5/1961   Carvajal _____ 195—51

OTHER REFERENCES

Kersters et al.: Biochem. et Biophys. Acta, vol. 71, No. 2 pp. 311–31, 1963.

A. LOUIS MONACELL, Primary Examiner

G. M. NATH, Assistant Examiner